Feb. 21, 1956 C. COATES ET AL 2,735,901

ELECTROMAGNETIC TRANSDUCER

Filed July 23, 1954

INVENTORS C. COATES
C. H. GRAY
C. J. P. SMALL

BY J. F. McEneany

ATTORNEY

United States Patent Office 2,735,901 Patented Feb. 21, 1956

2,735,901

ELECTROMAGNETIC TRANSDUCER

Colin Coates, Oxhey, Watford, Charles H. Gray, Colindale, London, and Charles J. P. Small, Mill Hill, London, England, assignors to Westrex Company, Limited, formerly Western Electric Company, Limited, London, England Application July 23, 1954, Serial No. 445,346

4 Claims. (Cl. 179—100.2)

This invention relates to electromagnetic transducing devices and more particularly to those comprising one or more magnetic heads adapted to cooperate with a magnetic record member, and to mounting arrangements therefor.

A magnetic head of such a transducer usually comprises a laminated core member carrying two windings and having two nonmagnetic gaps therein, the front gap which cooperates with the record medium and the back gap which has the effect of reducing background noise. The pole-tips of the core forming the front gap are highly polished and form the bearing surface upon which the record medium moves. This medium usually comprises a tape or strip coated with a magnetic material in powdered form and this material is usually harder than the material of the pole-tips. Consequently, after a certain amount of use, the pole-tips are found to be worn to such an extent that they are no longer satisfactory, so that the whole head has to be replaced. Furthermore, in view of laminated nature of the core, the wear on the pole-tips gives rise to a series of ridges thereon which in turn produced grooving or scratching of the sound track on the record medium.

According to one aspect of this invention, an electromagnetic transducing device comprises a magnetic head adapted to cooperate with a magnetic record medium and including a laminated core structure, wherein the pole-tips adapted to engage the record medium are of non-laminated magnetic material.

According to another aspect of the invention, an electromagnetic transducing device comprises a magnetic head including a core member adapted to cooperate with a magnetic record medium wherein the pole-tips adapted to engage the record medium are detachably mounted on the core.

By using solid, non-laminated pole-tips, the wear produced by the passage of the record medium will not produce ridges or grooves, so that scratching of the sound track will not take place. It might be expected that the use of solid pole-tips would give rise to serious eddy current losses at high frequencies but this does not appear to be the case. By using detachable tips, it is possible to readily and quickly replace the tips when they have worn sufficiently and it is unnecessary to discard the whole of the magnetic head.

In the type of unit sometimes used for stereophonic recording or reproducing systems, four magnetic heads are provided and it is convenient to arrange these as two subassemblies each comprising two physically associated but magnetically independent heads. In such a case, it is convenient to mount the pole-tips for the two heads as a single unit so that they can be replaced together. Of course, a similar arrangement may be adopted for any number or arrangement of heads and if desired all the pole-tips could be mounted as a single unit.

It is also desirable that in a transducer of this type, the head position is adjustable with respect to the main part of the apparatus to which it is attached so that the magnetic head or heads may be accurately aligned with the sound track or tracks on the record medium.

According to another aspect of the invention, a mounting arrangement for an electromagnetic transducing unit including one or more magnetic heads comprises a mounting plate to which the unit is rigidly attached, a base plate, a spring member between the mounting plate and the base plate, a securing means for affixing the mounting plate to the base plate, the securing means being adjustable so that the distance between the base plate and the mounting plate may be varied and being such that the mounting plate and the unit may be rotated about the securing means, adjusting means between the base plate and the mounting plate by which the mounting plate may be tilted wtih respect to the base plate, and locking means for preventing relative motion between the base plate and the mounting plate.

A more detailed description of the features of the invention will be given in conjunction with the accompanying drawings in which.

Figure 1:
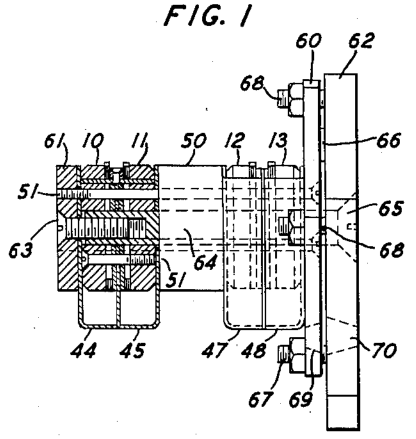
Fig. 1 shows, partly in section, a transducer having four magnetic heads and its mounting arrangement.

Referring now to the drawing, Fig. 1, shows the general arrangement of apparatus for reproducing from four sound tracks arranged on a standard 35-millimeter cinematograph film which also carried pictures. On such a film two of the sound tracks are located between the edges of the film and the sprocket holes and the other two tracks are placed between the sprocket holes and the edges of the picture-bearing portion of the film. The tracks are of very small width, for example, 0.048 inch, and it is, therefore, necessary to ensure that the location of the magnetic heads with respect to the film is very accurately controllable. The heads are arranged in two pairs, 10, 11 and 12, 13, one of which pairs is shown more clearly in Figs. 3, 4, 5 and 6.

Each pair of heads comprises two core members 20, 21 built up of laminations of magnetic material, for example, mu-metal. Each core is composed of two semicircles separated at their lower ends (Fig. 4) by a thin insert of nonmagnetic material 39 which defines the back gap. The core members are clamped between nonmagnetic, for example, brass, retaining members, 22, 23 and 24, 25, respectively, whilst the two cores are partially shielded from one another by magnetic shield 26, which may also be made of mu-metal. These two assemblies form a single unit held together by screws 27 passing through apertures in members 22, 23, 24 and 26 and threading into member 25. The clamping members are shaped so that they engage portions only of the core members, the remainder of which are exposed so as to receive windings 28 and 29. The two windings on a core are connected in series and the free ends may be brought out in any suitable manner so that they can be connected to amplifying apparatus. The upper ends of the cores (Fig. 4) are ground or otherwise machined to form flat seating surfaces 30, 31 upon which the pole-tips are seated. A groove 19 is cut through the clamping members and the pole-tips into which a supporting member for the pole-tips fits as will be described subsequently.

Figure 5:
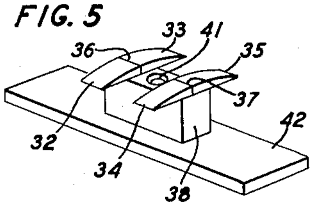
Figure 6:
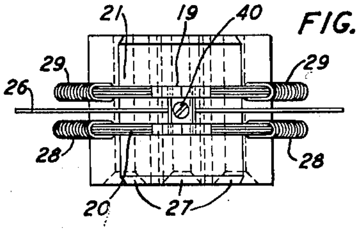

The pole-tips for the pair of heads are mounted as a single unit as shown in Fig. 5. This unit comprises the tips 32, 33 and 34, 35 affixed to mounting block 38. Tips 32, 33 define the front gap 36 of head 10 and tips 34, 35 define the front gap 37 of head 11. The tips are preferably of the same material as the core with which they are associated, and are not of laminated construction so that they provide a solid bearing surface for the record medium to slide over. They may conveniently be made from a single core lamination placed flat and suitably shaped. It will be appreciated, of course, that the size of the pole-piece assembly is exaggerated in Fig. 5. In practice, the width of the pole-tips is substantially the same as the width of the sound track with which it cooperates and is thus of the order of .05 inch. The supporting block 38 is of nonmagnetic material, for example, brass and the pole-tips may be conveniently attached thereto by brazing with silver solder. It is found that this process may be carried out at a temperature that does not affect adversely the magnetic properties of the material of the tips.

The supporting block 38 carrying the pole-tips slides into the groove 19 and is retained in position by a screw 40 passing through hole 41 in the block and engaging a threaded hole in the nonmagnetic strip 42 which slides into the channel 43 in the clamping members and in effect forms an elongated nut. By using a long strip it is possible to prevent any tendency of the mounting block to twist in its groove which would cause the pole-tips to become slightly displaced. The pole-tips must be positioned on the block 38 with very great accuracy and the block in turn must be accurately positioned in the groove so that the pole-tips bed down on the seating flat surfaces on the core and thus are in good magnetic contact therewith. Any lack of good contact will have a serious effect on the magnitude of the speech currents induced in the coils 28, 29 from the sound tracks.

In order to reduce cross-talk between the heads, the magnetic screen 26 is introduced between the cores and the heads are partially enclosed in the cup shaped magnetic shields 44, 45 made, for example, of mu-metal. These cup shields are cut away at 46 to allow the pole-tips to protrude. Since these unshielded portions of the magnetic circuit may give rise to cross-talk, the magnetic shunt (not shown) can be used between the cores in the manner disclosed in United States Patent 2,640,886, June 2, 1953, to C. C. Davis. Such a shunt provides a low-reluctance path between the heads which effectively cancels any cross-talk produced between the heads.

From the above description it can be seen that the pole-tip unit can be readily removed from the head assembly by removing the screw 40. Thus, when the pole-tips become badly worn they can be readily replaced by new ones. Furthermore, since the pole-tips are not laminated, they will not produce grooving of the sound tracks and thus undesirable wear of the sound tracks is avoided. It is also possible to change the characteristics of the heads by substituting a pole-tip assembly in which the front gaps are enlarged or reduced or in which the width of the pole-tips is different. Previously, any of these operations have required a replacement of the entire head and, consequently, the dismantling of the apparatus.

Figure 2:
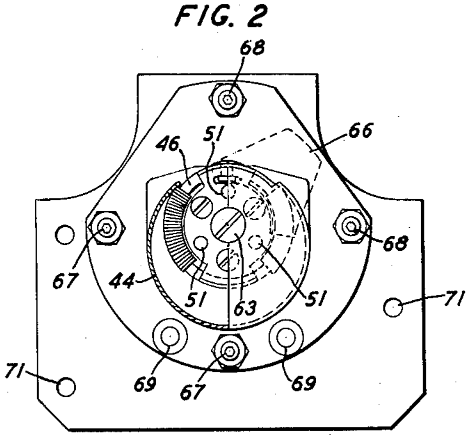
Fig. 2 shows a plan view of the transducer and mounting of Fig. 1.
Figure 3:
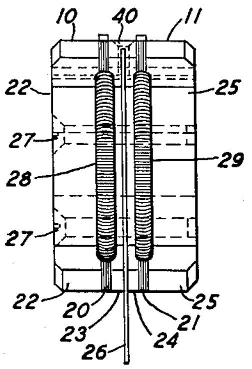
Figs. 3, 4, 5 and 6 show in more detail two magnetic heads of Fig. 1.
Figure 4:
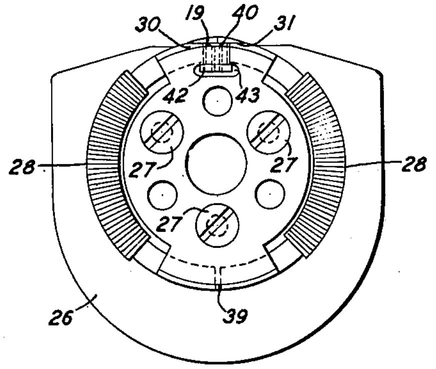

The two pairs of heads are mounted as shown in Figs. 1 and 2. The pairs of heads 10, 11 and 12, 13 enclosed in their shields 44, 45 and 47, 48 are spaced apart by spacer 50 and the whole unit is held together and to the mounting plate 60 by three long screws 51 extending from the plate 60 and threading into the cover member 61. The plate 60 is then affixed to the base member 62 by screw 63 and sleeve 64 passing axially through the assembly, the screw 63 threading into the end of sleeve 64. Sleeve 64 has a head 65 forming a portion of sphere which seats in a similarly shaped hole in base member 62 so that the screw and the assembly mounted thereon may be tilted with respect to the base.

Between the base and the plate 60 is a spring 66, the shape of which is shown by the dotted line in Fig. 2. This spring is affixed at its broad end to the plate 60 as by screws or rivets whilst its narrow end is bent over to engage the base member 62. The plate 60 is also provided with four socket headed studs 67, 67 and 68, 68 each having a lock nut, the ends of the studs abutting against the base 62. These studs serve to permit of adjustment of and to lock the plate 60. The two studs 68 serve to lock the plate, and when they are slackened off, it is possible to rotate the assembly and the plate about sleeve 64. It is also possible to tilt the assembly on the pivot formed by the head of sleeve 64 by adjusting studs 67 when the studs 68 are slackened off. When the desired adjustment has been made tightening studs 68 will lock the assembly in position. By adjusting the screw 63 it is possible to compress or expand spring 66 and thus adjust the distance between the plate 60 and the base 62. Thus, the mounting permits four different adjustments of the head position with respect to the base to be effected, which is sufficient to ensure accurate alignment of the magnetic heads with their respective sound tracks under any conditions.

In order to facilitate the rotary adjustments, two pairs of opposed conical apertures 69, 70 are provided in the plate 60 and the base 62. By inserting a suitable lever tool into the apertures it is possible to produce small controlled relative motions between the plate and the base. A combined tool for the above purpose and for adjusting the studs 67 may comprise a metal rod one end of which is turned to a suitable dimension to act as the lever and the other end of which is formed of hexagonal section to fit the hexagonal sockets in the heads of the studs 67.

The whole assembly may be mounted in the cinematograph apparatus by suitable screws passing through holes 71 in the base member.

Although the embodiment described has the pole-tips for two heads mounted as a single unit, it will be understood that all pole-tips could be mounted as a single unit by using a block of sufficient length. Also, the pole-tips for each head could be mounted individually by mounting the tips on the end of a smaller block and providing the screw hole in the remainder of the block.

The arrangement described of mounting the pole-tips is also advantageous from the manufacturing point of view since a number of the blocks with pole-tips attached can be mounted in a suitable retaining member and turned on a lathe to the required contour in a single operation.

What is claimed is:

1. A magnetic head for an electromagnetic transducing device, said magnetic head comprising a plurality of spaced core members mounted on a common support, a plurality of pairs of air-gap forming pole members, each of said pairs of pole members being magnetically insulated from an adjacent one of said pairs of pole members, each of said pairs of pole members being mounted in magnetic conductive contact with an individual one of said plurality of core members, a member of nonmagnetic material to which all of said pairs of pole members are secured, said member of nonmagnetic material being removably mounted on said common support for said plurality of spaced core members.

2. In combination, an electromagnetic transducing unit including a magnetic head having a core member and a pair of air-gap forming pole members in magnetic conductive contact with said core member, an adjustable mounting for said transducing unit comprising a fixed base plate, an adjustable mounting plate to which said transducing unit is rigidly attached, means securing said mounting plate to said base plate, said securing means including elements permitting rotation of said mounting plate about its axis in its own plane and movement thereof to vary the angle between the plane of said mounting plate and the plane of said base plate, means adjusting the angular relation between the plane of said mounting plate and the plane of said base plate, and means for locking said mounting plate in an adjusted position.

3. The combination as in claim 2 in which said securing means includes a rod extending through said mounting plate at the axis thereof, said rod having a rounded head portion in engagement with an aligned rounded recess in said base plate whereby rotational and tilting adjustments may be applied to said transducing unit.

4. The combination as in claim 2 in which said means for adjusting the angular relation between the plane of said mounting plate and the plane of said base plate comprises spring means disposed between said base plate and said mounting plate, and acting to tilt the plane of said mounting plate with respect to said base plate, a plurality of rotatable studs threaded into said mounting plate and abutting against one lateral face of said base plate, said studs being adjustable to control the amount and direction of tilting of said mounting plate under the action of said spring means.

References Cited in the file of this patent

UNITED STATES PATENTS

| | | |
|---|---|---|
| 2,361,752 | Eilenberger | Oct. 31, 1944 |